Patented July 7, 1931

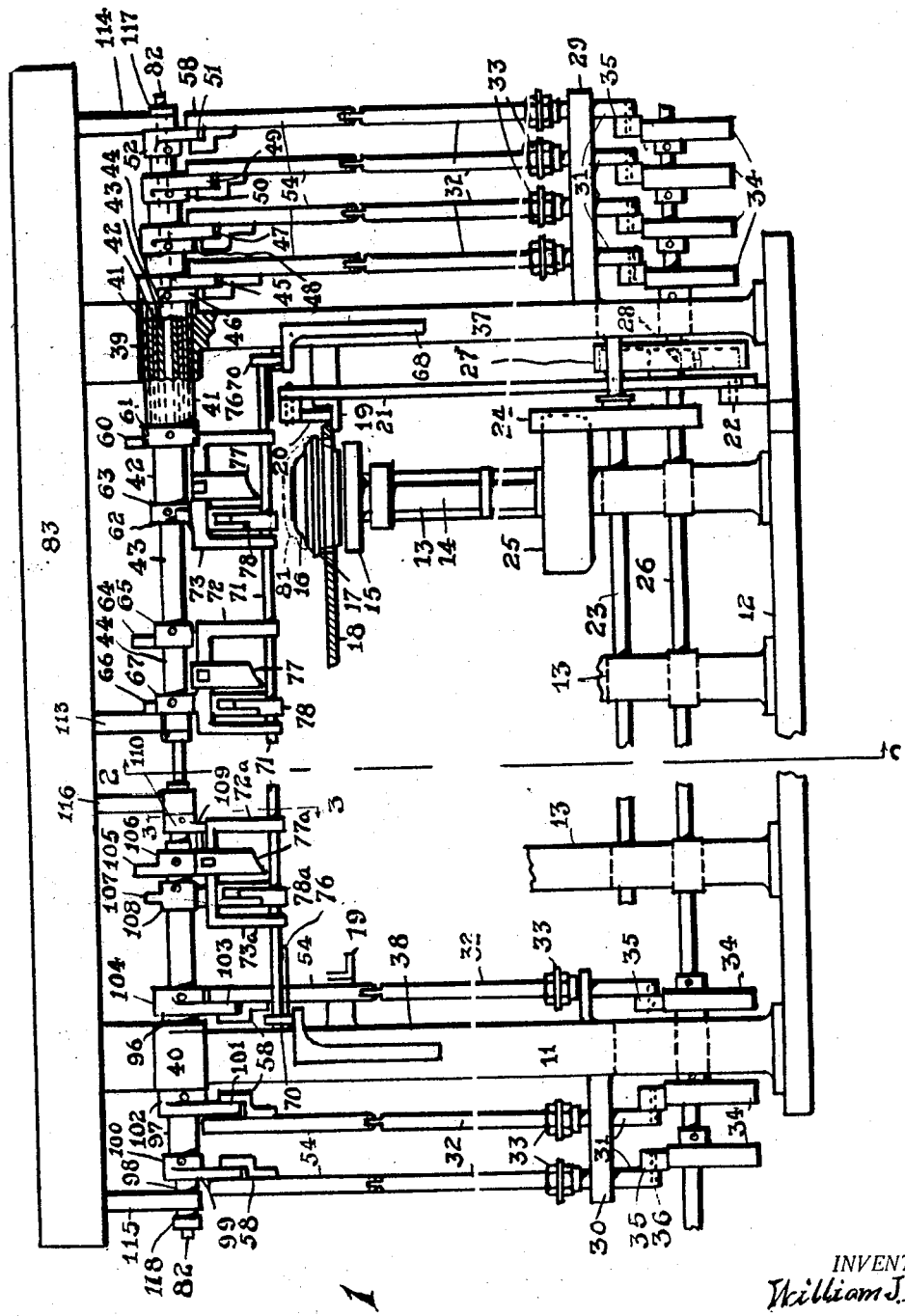

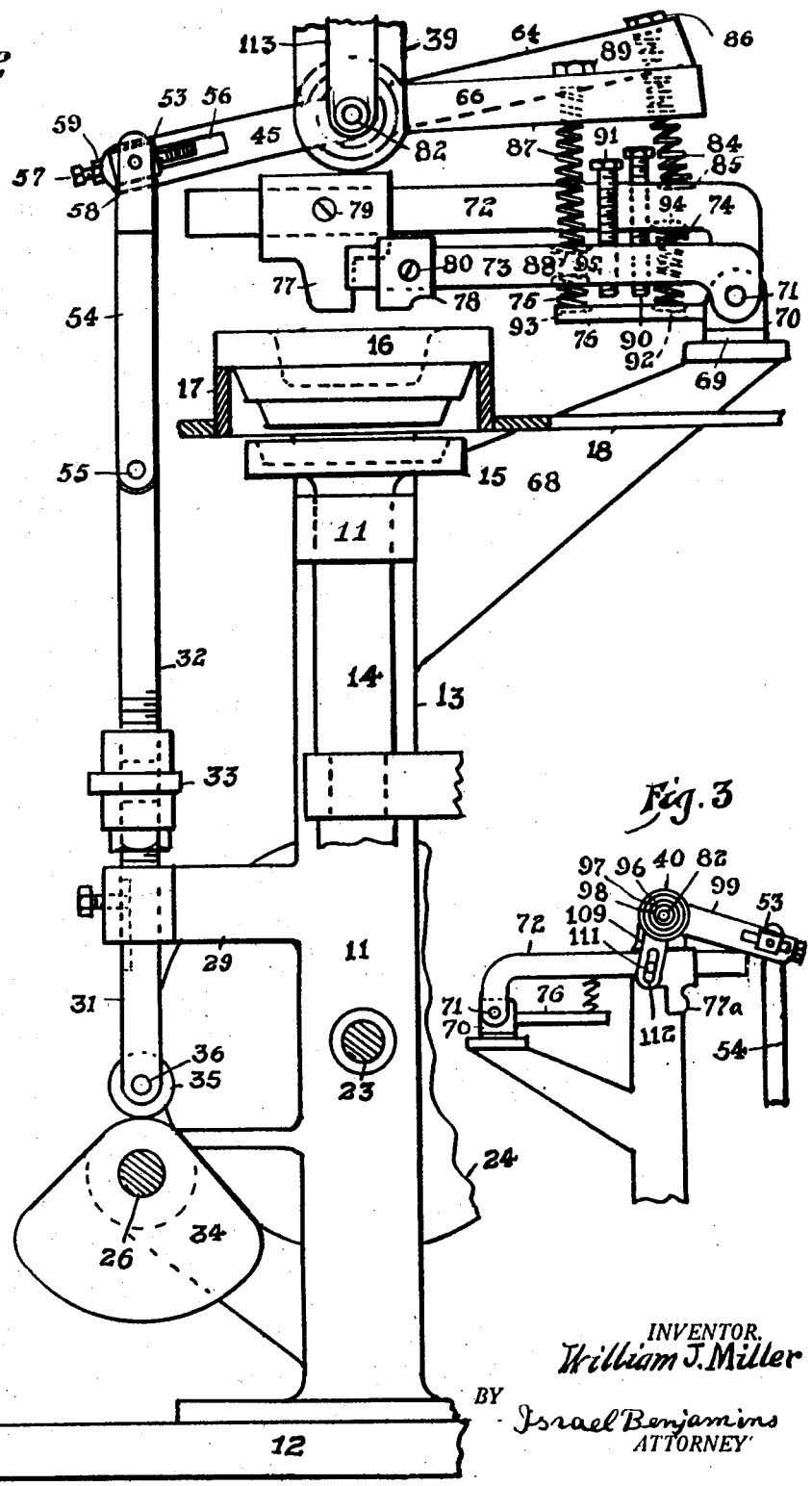

1,812,893

UNITED STATES PATENT OFFICE

WILLIAM J. MILLER, OF SWISSVALE, PENNSYLVANIA

POTTERY FORMING MACHINE

Application filed February 5, 1927, Serial No. 166,181. Renewed January 27, 1928.

My invention relates to improvements in the manufacture of articles from plastic materials, and particularly in the art of making pottery, and it consists in the novel features, which are hereinafter described.

One of the objects of my improvement is—to provide a perfected multiple profile and trimmer for use with multiple jiggers, such as described in my copending application for patent for multiple and automatic jigger for use in the manufacture of articles from plastic materials, filed November 17, 1926, Serial No. 148,872, and wherein the molds are preferably conveyed on recessed trays in a rectilinear plane to a position between shaping tools and reciprocating and rotating chucks.

Another object of my improvement is—to provide independent means for the control and adjustment of each profile and trimmer separately from all the other profiles and trimmers of the machine.

A further object of my improvement is—to provide horizontal as well as vertical adjustment with the type of automatic profiles, which are hereinafter described.

A further object of my improvement is—to have all the units of my automatic profile, trimmer and jigger combined compact and operated from a single set of bearings.

Another object of my improvement is—to provide a combined automatic profile, trimmer and jigger in a pottery forming machine which is simple, durable and inexpensive.

Other objects and advantages will hereinafter appear.

I attain these objects by the mechanism, illustrated in the accompanying drawings or by any mechanical equivalent or obvious modification of the same.

In the drawings Fig. 1 is a front elevation of my automatic profile, trimmer and jigger combined, shown as applied to multiple jiggers, such as described in my above copending application with the middle parts of the machine broken away showing some parts in cross-section and omitting sundry parts of the machine.

Fig. 2 is an end elevation on the line 2—2 of Fig. 1, looking in the direction of the arrows, also omitting sundry parts of the machine, and showing others as partly broken away.

Fig. 3 is a detail end view in elevation of parts, which are hereinafter described, on the line 3—3 of Fig. 1, looking in the direction of the arrows.

Like numerals refer to like parts throughout the several views.

11 designates the frame of the machine, and 12 a base under said frame 11.

Jigger supports 13 are shown as positioned on said base 12, and have reciprocating jigger spindles 14 slidably mounted thereon; the spindles 14 terminating in chucks 15, which operate to intermittently raise molds 16 from seats 17 in carriers 18, which ride on a track 19, and are propelled by extensible latches 20, as in my above copending application.

The latches 20 are shown at the right hand side of Fig. 1 as pivotally connected to the upper ends of oscillating arms 21, which are pivotally mounted on bearings 22, which are secured to said base 12.

A high speed power shaft 23 is shown as having mounted thereon vertical friction gears 24, intermittently to engage horizontal friction gears 25 on said spindles 14, as described in the above copending application.

A cam shaft 26 may be back-geared from said shaft 23, or preferably independently driven, and it has adjustably secured thereto a pair of positive cams 27, one of which is shown in Fig. 1, each of said cams being adapted to engage a roll 28, which is pivotally connected to one of said arms 21, to actuate the latter with the latches 20 thereon, thereby intermittently moving said carriers 18 on said track 19, as described more in detail in my above copending application.

The frame 11 is shown as having thereon horizontal brackets 29 and 30, for slidably connecting thereto vertical extensible pitmen 31—32, which consist each of two sections 31 and 32, adjustably secured to each other by a union 33, whereby the length of each of said pitmen 31—32 may be varied and adjusted.

Rotary cams 34 are shown as adjustably secured to said shaft 26, in contact with rolls 35, which are shown as pivotally connected to the lower ends of said pitmen 31—32 by means of pins 36, whereby said pitmen 31—32 may have a reciprocating motion imparted thereto. The cams 34 have each an individual outline of its own, which may differ from the outlines of some of the cams of the machine, and may also be similar to the outline of one or more other cams of the machine, and each cam is designed to impart a predetermined motion to the part of the mechanism, which it actuates, as is hereinafter described.

The frame 11 comprises two columns 37 and 38, shown as connected by an overhead beam 83. The column 37 has at the upper end thereof a bearing 39 and the column 38 has at the upper end thereof a bearing 40.

A hollow spindle 41 is revolvably supported in said bearing 39; another hollow spindle 42 is revolvably supported in said spindle 41 concentrically therewith, the spindle 41 serving as a bearing for said spindle 42.

A third hollow spindle 43 is revolvably supported in said spindle 42 concentrically therewith, the spindle 42 serving as a bearing for said spindle 43.

A fourth hollow spindle 44, is revolvably supported in said spindle 43, the latter serving as a bearing for the former.

An innermost shaft 82, which may be either solid or hollow, extends through the inside of said spindle 44 and through the inside of another set of concentric hollow spindles, which are supported by said bearing 40, as hereinafter described, to keep the inner ends of said spindles from getting out of alignment with each other.

A hanger 113, which is secured to said beam 83 by means of suitable fastenings, is provided, to support the inner end of said spindle 44, for the latter to oscillate therein; a similar hanger 114 is provided for supporting the outer end of said spindle 44, for the latter to oscillate therein, thereby preventing undue bending strains on said spindle 44 and also on some of the other spindles.

A rearwardly extending arm 45, which has thereon a hub 46, is adjustably secured to the outer end of said spindle 41 by means of a suitable set screw on said hub 46; another rearwardly extending arm 47, which has thereon a hub 48, may be likewise adjustably secured to the outer end of said spindle 42; a third rearwardly extending arm 49, which has thereon a hub 50, is similarly secured to the outer end of said spindle 43, and a fourth rearwardly extending arm 51, which has thereon a hub 52, is in the same way secured to the outer end of said spindle 44.

Each of said arms 45, 47, 49 and 51 is pivotally connected by means of a floating pivot-block 53 to a bifurcation 58 at the upper end of a connecting rod 54, as shown in Fig. 2, each of the latter in turn being pivotally connected by means of a pin 55 to one of said pitmen 31—32, thereby oscillating said spindles 41, 42, 43 and 44 during the operation of the machine.

Each of the floating blocks 53 is slidably mounted in a slot 56 in each of said arms 45, 47, 49 and 51, and is adjusted in position by means of a regulating screw 57 in the end of said arms, as shown in Fig. 2, whereby the angle of oscillation of said arms and said spindles may be varied and adjusted while in operation and while the driving connection subsists.

A lock nut 59 is shown in Fig. 2 as securing said screw 57 against accidental displacement.

A forwardly extending arm 60, which has thereon a hub 61, is adjustably secured to the inner end of said spindle 41 by means of a suitable set screw on said hub 61; another forwardly extending arm 62, which has thereon a hub 63, is adjustably secured to the inner end of said spindle 42 by means of a screw on said hub 63.

A third forwardly extending arm 64, which has thereon a hub 65, is adjustably secured to the inner end of said spindle 43 by means of a screw on said hub 65; and a fourth forwardly extending arm 66, which has thereon a hub 67, is adjustably secured to the inner end of said spindle 44 by means of a screw on said hub 67.

Each of said columns 37 and 38 has thereon near the upper end thereof a forwardly extending bracket 68, which is shown in Fig. 2 as capped by a base 69, for a bearing 70 to be mounted thereon.

A shaft 71 is revolvably supported at the ends thereof by said bearings 70.

Oscillating arms 72 and 73 are shown in Fig. 2 as swivelled on said shaft 71, and are normally kept in their higher positions by means of compression springs 74 and 75 respectively.

Each of the springs 74 is resting with its lower end in a depression 92 on one of a pair of platforms 76, which are stationary with relation to said bearings 70, and may be made integral therewith; and each of said springs 74 is extending at its upper end into a cavity 94 in the underside of one of said arms 72; the springs 75 are resting with their lower ends in depressions 93 on said platforms 76, and are extending at their upper ends into cavities 95 in the underside of said arms 73.

The arms 72 are disposed under said arms 60 and 64, and said arms 73 are situated under said arms 62 and 66, as shown in Fig. 1.

Profiles 77 are connected to said arms 72 and trimmers 78 are connected to said arms 73 by means of bolts or screws 79 and 80 respectively, as shown in Fig. 2, to shape and trim a charge of material 81 on each of the number of said molds 16, which are shown as intermittently supported by chucks 15 at the upper ends of said jigger spindles 14, to reciprocate and revolve on said jigger-spindles 14, as described in my above copending application.

The reciprocation of the chucks 15 may be produced only to the extent of raising the molds 16 from the seats 17 of the carriers 18, to facilitate the rotation of the molds 16 with said chucks 15 thereunder. The shaping of the material 81 on said molds 16 may be mainly accomplished by the gradual vertical motion of said profiles 77.

The molds 16 and profiles 77 may also be employed with jiggers of ordinary design, if desired.

Compression springs 84 are interposed between each of said arms 60 and 64 and said arms 72, intermittently to depress said arms 72 with the profiles 77 thereon, to bring the latter vertically into operative position, to shape said material 81 on said molds 16.

The lower ends of said springs 84 are resting in depressions 85 on said arms 72, and the upper ends of said springs 84 are abutting against the underside of screws 86 in said arms 60 and 64, whereby the pressure of said springs 84 may be adjusted.

Compression springs 87 are also interposed between each of said arms 62 and 66 and said arms 73, intermittently to depress said arms 73 with the trimmers thereon, to bring the latter into operative position, to trim the material 81 on said molds 16.

The lower ends of said springs 87 rest in depressions 88 on said arms 73, and the upper ends of said springs 87 are abutting against the underside of adjusting screws 89 in said arms 62 and 66, whereby the pressure of said springs 87 may be regulated.

Screws 90 in said arms 72 have their lower ends intercepted by said platform 76, adjustably to limit the downward motion of said arms 72; and similar screws 91 are provided in said arms 73, for a similar purpose.

The phase of motion of each of said profiles 77 with relation to its corresponding trimmer 78 may be determined by the outline of each of said cams 34, which actuates each of said profiles and trimmers, and the position of the said cams on said shaft 26.

The bearing 40 on said column 38 has also revolvably mounted therein a hollow spindle 96; another hollow spindle 97 is revolvably mounted inside of said spindle 96, which serves as a bearing for said spindle 97; a third hollow spindle 98, is revolvably mounted inside of said spindle 97, which serves as a bearing therefor.

A hanger 115, which is secured at its upper end to said beam 83, is provided to support the outer end of said spindle 98, for the latter to oscillate in said hanger 115, and a similar hanger 116 is provided for the inner end of said spindle 98, which also serves as a bearing for the left hand end of said innermost shaft 82, which extends through the entire length of said spindles 44 and 98, to keep them in alignment with each other.

Collars 117 and 118 on the ends of skid shaft 82, prevent longitudinal displacement of the latter with relation to said spindles 44 and 98.

An arm 99, which has thereon a hub 100, is adjustably secured to the outer end of said spindle 98 by means of a set screw on said hub 100, and is pivotally connected to the upper end of a connecting rod 54 by means of a pivot block 53 and suitable pins in a bifurcation 58 at the upper end of said rod 54.

A slot 56 is provided in said arm 99 for said block 53 to slide therein, and a regulating screw 57, passing through the end of said arm 99, for adjusting the position of said block 53 in the slot 56 of said arm 99, substantially as shown in Fig. 2 in connection with said arm 45.

The lower end of said last mentioned rod 54 is pivotally connected to the upper end of one of said pitmen 32 by means of a pin 55.

Another arm 101, which has thereon a hub 102, is adjustably secured to the outer end of said spindle 97 by means of a set screw on said hub 102, and is likewise connected to one of said pitmen 32 by means of one of said connecting rods 54 in the same way as said arm 99.

The arm 99 is employed for oscillating said spindle 98, and said arm 101 is employed to oscillate said spindle 97; the angles of oscillation of said spindles 98 and 97 may be regulated by means of screws 57 on said arms 99 and 101, as is hereinbefore described in connection with said arm 45 and spindle 41.

An arm 103, which has thereon a hub 104 is adjustably secured to said spindle 96, to the right of said bearing 40 in Fig. 1, by means of a set screw in said hub 104, and is also connected to a pitman 32 by means of a connecting rod 54, in the same way as said arms 99 and 101, whereby said spindle 96 may be oscillated; the angle of oscillation of said spindle 96 may also be varied and adjusted by means of a regulating screw 57 on said arm 103, as hereinbefore described in connection with said arm 45 and said spindle 41.

An arm 105, which has thereon a hub 106, is adjustably secured to the inner end of said spindle 97 by means of a set-screw on said hub 106, to oscillate with said spindle 97.

An arm 107, which has thereon a hub 108, is adjustably secured to the inner end of said spindle 96 by means of a set-screw on said hub 108, to oscillate with said spindle 96.

An arm 109, which has thereon a hub 110, is adjustably secured to the inner end of said spindle 98 by means of a set screw on said hub 110, to oscillate with said spindle 98, for a purpose, which is hereinafter described.

The spindle 96 with the arm 107 at the inner end thereof is oscillated by means of the arm 103 on said spindle 96, to the right of said bearing 40 in Fig. 1.

The spindle 97 with the arm 105 at the inner end thereof is oscillated by means of the arm 101 at the outer end of said spindle 97.

The spindle 98 with the arm 109 at the inner end thereof is oscillated by means of the arm 99 at the outer end of said spindle 98.

The left hand end of said shaft 71 has also swivelled thereon an arm 72a and an arm 73a, which may be normally supported in an elevated position by means of springs 74 and 75 respectively, under said arms 105 and 107 respectively. The springs 74 and 75 may rest on a platform 76 on the bearings 70, as hereinbefore described.

A spring 84 may be interposed between said arm 72a and the underside of a regulating screw in said arm 105, and a spring 87 may be interposed between said arm 73a and the underside of an adjusting screw in said arm 107, for the same purpose, as is hereinbefore described in connection with said arms 60 and 62.

The arm 72a, under said arm 105, has slidably mounted thereon a profile 77a, for shaping the material of deep ware, such as cups and the like.

The arm 73a, under said arm 107 has secured thereto a trimmer 78a of above described construction, for the operation of trimming the rim of said deep ware.

Vertical motion is imparted to said profile 77a and trimmer 78a by the oscillation of said arms 105 and 107 respectively, in substantially the same way as to said profiles 77 and trimmers 78, as hereinbefore described.

To afford a horizontal motion to said profile 77a, for bringing it into operative position in deep ware, I provide a pin 111 on said profile 77a, as shown in Fig. 3. The pin 111 is in engagement with a slot 112 in said arm 109 on said spindle 98, whereby said profile 77a may be shifted horizontally by the oscillation of said spindle 98, and the phase of said horizontal motion of said profile 77a may be determined by the outline of the particular cam 34, which actuates said arm 99 and spindle 98, and by the adjustment of the position of said arms 99 and 109 on said spindle 98, as hereinbefore described.

The pin 111 may be secured to the arm 109, and the slot 112 provided in the profile 77a, instead of the arrangement as shown in Fig. 3, if desired.

The number of profile arms and trimmer arms, together with the number of jiggers, on which they operate, may be increased or diminished, if desired.

Many other changes may be made in the details of my machine, without departing from the main scope of my invention, and parts thereof may be used without other parts.

I do not therefore restrict myself to the details as shown in the drawings, but I intend to include also all mechanical equivalents and obvious modifications of the same within the scope of my invention.

I claim as my invention and desire to secure by Letters Patent:

1. In a pottery forming machine a pivotally mounted arm, a trimmer thereon, another pivotally mounted arm, a profile thereon, a means for intermittently depressing said trimmer arm, a means for intermittently depressing said profile arm, a jigger and rotary cams on said jigger, for actuating each of said depressing means independently of the other.

2. In a pottery forming machine multiple pivotally mounted arms, profiles thereon, other multiple, pivotally mounted arms, trimmers thereon, a means for intermittently depressing each of said arms independently of each other, a jigger and rotary cams on said jigger, for actuating said depressing means independently of each other.

3. In a pottery forming machine a pivotally mounted arm, a profile thereon, another pivotally mounted arm, a trimmer thereon, an oscillating spindle, an arm thereon, for intermittently depressing said profile arm, another oscillating spindle, an arm thereon, for intermittently depressing said trimmer arm, a jigger and a means, for actuating said spindles independently of each other, operatively connected to said jigger.

4. In a pottery forming machine multiple pivotally mounted arms with profiles thereon, other multiple pivotally mounted arms with trimmers thereon, an oscillating spindle with an arm thereon for each of said profile arms and trimmer arms, for intermittently depressing each of said profile arms and trimmer arms, multiple jiggers and a means, for actuating said spindles independently of each other, operatively connected to said jiggers.

5. In a pottery forming machine multiple pivotally mounted arms with profiles thereon, multiple pivotally mounted arms with trimmers thereon, an oscillating spindle for each of said arms, said spindles being journalled within each other coaxially with each other, each successive outer spindle serving as a bearing for each successive inner spindle, multiple jiggers, arms on said spindles, for intermittently depressing said profile arms and said trimmers arms, and other arms on said spindles, for operatively connecting the same to said jiggers.

6. In a pottery forming machine a pivotally mounted arm, a profile slidably mounted thereon, a means for intermittently depressing said arm, to move said profile vertically into operative position, a means for intermittently sliding said profile on said arm, to move said profile substantially horizontally into operative position, a jigger and rotary cams on said jigger, for actuating said depressing means and said sliding means independently of each other.

7. In a pottery forming machine multiple pivotally mounted arms, profiles slidably mounted thereon, a means for intermittently depressing each of said arms independently of each other, for moving said profiles vertically into operative position, a means for intermittently sliding each of said profiles on its arm independently of each other, for moving said profiles substantially horizontally into operative position, a jigger and rotary cams on said jigger, for actuating said depressing means and said sliding means independently of each other.

8. In a pottery forming machine, the combination with recessed mold-carrying trays and a plurality of molds carried by said trays, of reciprocable shaping tools mounted in alinement above the horizontal plane of said trays and reciprocable and rotatable chucks mounted below the horizontal plane of said trays, means for intermittently advancing the trays in a substantially straight line to a position between said shaping tools and said chucks; means for reciprocating and rotating said chucks to elevate said molds from said trays and rotate the molds adjacent said tools, and rotary cams also mounted in alinement for independently reciprocating said tools.

9. In a pottery forming machine, mold-actuating mechanism, multiple pivotally and resiliently mounted profiles, rocking members mounted in alinement adjacent said profiles, and independently adjustable cams operating in timed relation to said mold-actuating mechanism for actuating said rocking members.

10. In mechanism of the class specified, a jigger having a profile and trimmer mounted thereon adapted to be depressed into operative position, rocking members mounted on telescoping spindles adjacent said profile and trimmer, and means adjustable to operate in timed relation to said jigger for actuating said rocking members to intermittently depress said profile and trimmer.

11. In a pottery forming machine, mold rotating mechanism, profiles and trimmers pivotally and resiliently mounted in alinement on a common spindle on the machine, continuous motion cams, and a means for transmitting individual motion from said cams to said profiles and trimmers.

12. In a pottery forming machine, mold-actuating mechanism, multiple pivotally and resiliently mounted shaping tools, rocking members for independently depressing said tools into operative position, a reciprocating pitman having an adjustable pivotal connection with each of said members and multiple, independently adjustable, continuous motion cams for actuating said pitmen independently of one another.

13. In a pottery forming machine, the combination with recessed mold-carrying trays, of a plurality of depressible shaping tools mounted in alinement above, and reciprocable and rotatable chucks mounted in alinement below the horizontal plane of travel of said trays, means for advancing the trays in a substantially straight line to a position between said tools and said chucks, means for reciprocating and rotating said chucks, and means for depressing said tools into operative position with respect to a mold or molds consisting of a plurality of independently movable rocking members which are mounted in axial alinement adjacent said tools and means for independently actuating said members.

14. In a pottery forming machine, the combination with recessed mold-carrying trays, of a plurality of depressible shaping tools mounted in alinement above, and reciprocable and rotatable chucks mounted in alinement below the horizontal plane of travel of said trays, means for advancing the trays in a substantially straight line to a position between said tools and said chucks, means for reciprocating and rotating said chucks, and means for depressing said tools into operative position with respect to a mold or molds consisting of a plurality of independently movable rocker arms and pitmen having a shiftable pivotal connection with said arms, and means for independently actuating said members.

WILLIAM J. MILLER.